United States Patent
Benson et al.

(10) Patent No.: US 6,619,239 B1
(45) Date of Patent: Sep. 16, 2003

(54) WEIGHTED HANDLE DOG LEASH

(76) Inventors: Paula K. Benson, 2016 McClain Rd., Knoxville, TN (US) 37912; Nick F. Benson, 2016 McClain Rd., Knoxville, TN (US) 37912

(*) Notice: Subject to any disclaimer, the term of this patent is extended or adjusted under 35 U.S.C. 154(b) by 0 days.

(21) Appl. No.: 10/210,282

(22) Filed: Aug. 1, 2002

(51) Int. Cl.[7] .................. A01K 27/00; B65H 75/34
(52) U.S. Cl. ........................... 119/796; 119/795
(58) Field of Search .................... 119/769, 712, 119/792, 793, 791, 794, 795, 796, 772, 770

(56) References Cited

U.S. PATENT DOCUMENTS

| | | |
|---|---|---|
| 4,391,226 A | 7/1983 | Guthrie |
| 5,125,365 A | 6/1992 | Bonilla |
| 5,558,044 A | 9/1996 | Nasser et al. |
| D376,215 S | 12/1996 | Gomm et al. |
| 5,762,029 A | 6/1998 | DuBois et al. |
| 5,887,550 A | 3/1999 | Levine et al. |
| D410,117 S | 5/1999 | Ball et al. |
| 6,003,472 A | 12/1999 | Matt et al. |
| 6,024,054 A | 2/2000 | Matt et al. |
| 6,035,809 A | 3/2000 | Fingerett et al. |
| D425,265 S | 5/2000 | Rubinstein |
| 6,073,590 A | 6/2000 | Polding |
| 6,095,093 A * | 8/2000 | Kisko et al. .................. 119/770 |
| 6,148,773 A * | 11/2000 | Bogdahn .................... 119/796 |
| 6,223,695 B1 | 5/2001 | Edwards et al. |
| 6,289,849 B1 | 9/2001 | Macedo et al. |
| 6,314,917 B1 | 11/2001 | Ryan |
| D453,386 S | 2/2002 | Philipson |
| 6,405,683 B1 * | 6/2002 | Walter et al. ................ 119/772 |

* cited by examiner

Primary Examiner—Charles T. Jordan
Assistant Examiner—Judith A. Nelson
(74) Attorney, Agent, or Firm—Pitts & Brittian, P.C.

(57) ABSTRACT

A weighted pet leash assembly including a housing for containing the leash in a retracted condition. The housing includes a handle which is integrally formed with a handle of a hand weight such as a dumbbell such that gripping the dumbbell handle places the finger of a user proximate the leash assembly trigger for selectively activating a stop mechanism to terminate travel of the leash through an opening in the leash housing. The weighted pet leash assembly can be used in combination with a conventional dumbbell or other hand weight such that each arm of the user is being exercised simultaneously.

21 Claims, 2 Drawing Sheets

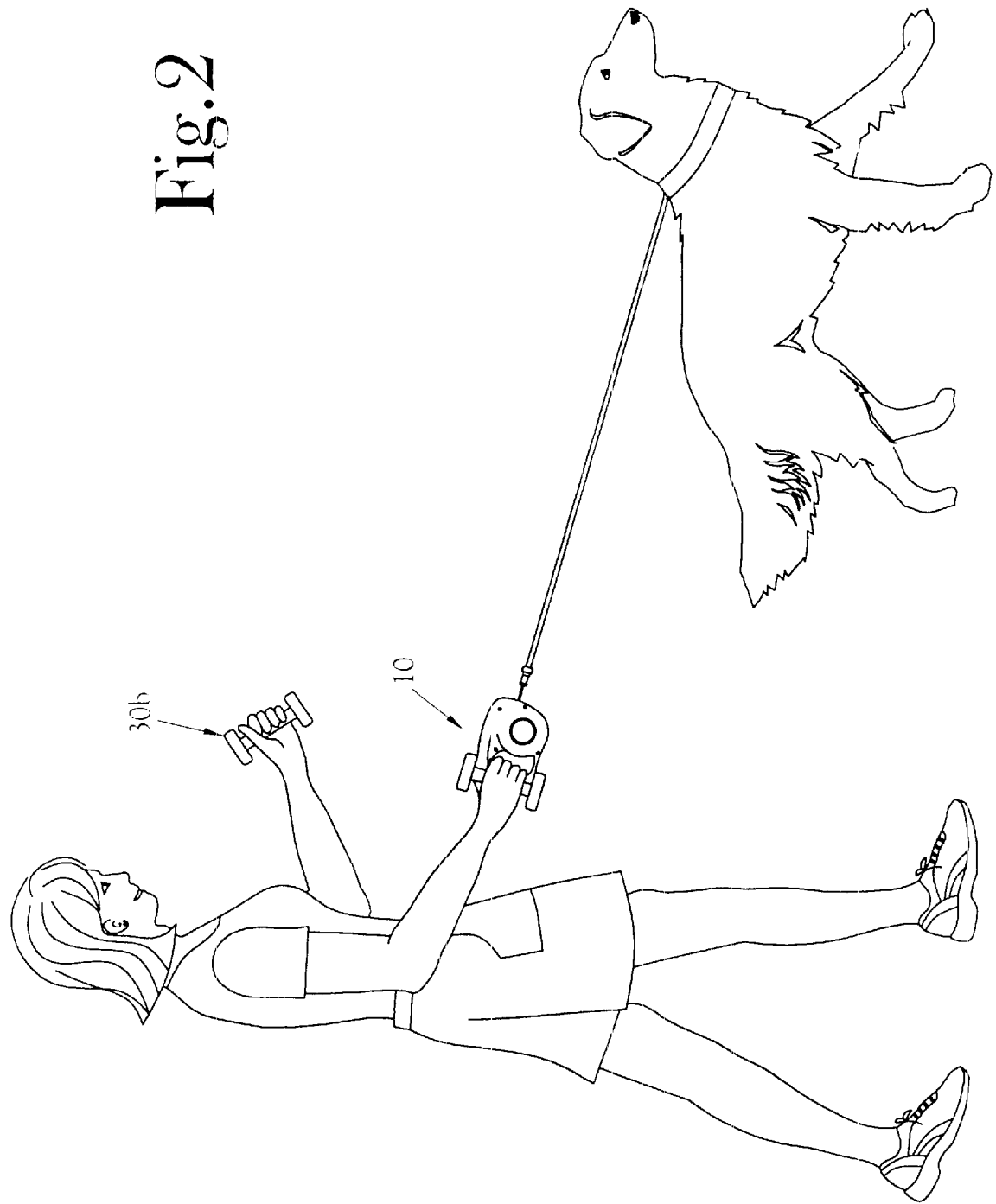

WEIGHTED HANDLE DOG LEASH

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

The present invention relates to pet leashes and more specifically relates to a combined pet leash assembly and hand weight such as a dumbbell which allows a user to utilize hand weights for power walking while simultaneously walking a pet.

2. Description of the Related Art

Leashes for controlling pets during walking are old in the art, and often include a housing which contains a coiled leash carried by a spring biased reel. The leash can be controlled by a stop mechanism which selectively prevents, or allows, the leash from/to travel through an opening in the housing. Normally there is a trigger or other actuator deployed by the user who selectively actives the stop mechanism. With an increased awareness of the need for fitness, more individuals are power walking to increase their cardiovascular health, muscle tone, and to lose weight. The effectiveness of power walking activity can be enhanced by the utilization of hand weights. However, it is difficult to hold a conventional leash and hand weight in the same hand while walking a pet.

Heretofore, it has been known to combine conventional retractable leashes with other devices related to walking pets. For example, U.S. Pat. No. 6,035,809 shows a combination pet leash and pouch for animal waste. U.S. Pat. No. 6,073,590 shows a dog leash having a bag container for a supply of grocery bags for collecting pet excrement. U.S. Pat. No. 6,223,695 discloses a leash assembly including a retractable leash in combination with a pet refuse bag dispenser. U.S. Pat. No. 6,003,472 discloses a retractable leash which is combined with a flashlight. Other known United States patents related to the general field of the present invention are as follows:

U.S. Patent Nos

U.S. Pat. No. D376,215
U.S. Pat. No. D410,117
U.S. Pat. No. D425,265
U.S. Pat. No. D453,386
U.S. Pat. No. 4,391,226
U.S. Pat. No. 5,125,365
U.S. Pat. No. 5,558,044
U.S. Pat. No. 5,762,029
U.S. Pat. No. 5,887,550
U.S. Pat. No. 6,024,054
U.S. Pat. No. 6,289,849
U.S. Pat. No. 6,314,917

While the option of using hand weights is available to anyone, it is cumbersome to simultaneously use hand weights and walk a dog or other pet. The present invention is directed to a combination retractable pet leash assembly and hand weight which are integrally formed such that by gripping the handle of a hand weight such as a dumbbell type weight, the operator's finger is placed proximate an actuator such as a trigger for selectively activating a stop mechanism which controls the travel of the leash through its housing.

BRIEF SUMMARY OF THE INVENTION

The present invention provides a weighted pet leash assembly having a housing which contains a leash in a retracted condition. The leash assembly has a handle and an opening through which the leash travels under the control of a stop mechanism which selectively terminates leash movement into and out of the housing. A hand weight handle is integrally formed with the handle of the leash housing such that gripping of the dumbbell handle by a user places the user's finger proximate a trigger or other suitable actuator that selectively controls the stop mechanism and movement of the leash.

BRIEF DESCRIPTION OF THE DRAWINGS

The above-mentioned features of the invention will become more clearly understood from the following detailed description of the invention read together with the drawings in which:

FIG. 2 illustrates the use of the invention in a power walking activity while the user is simultaneously wailing a dog.

DETAILED DESCRIPTION OF THE PREFERRED EMBODIMENT

Figure 1:
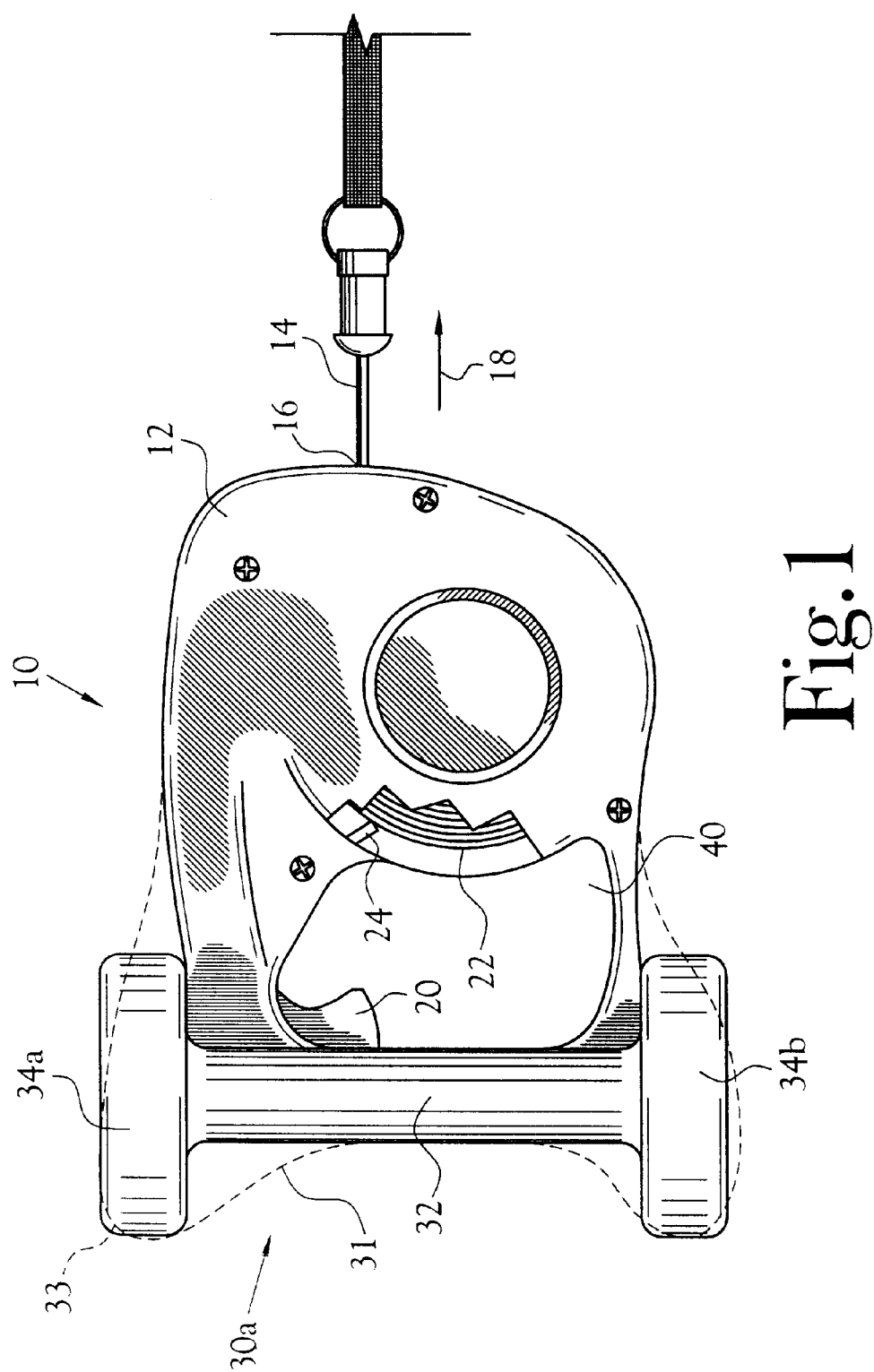
FIG. 1 illustrates a weighted pet leash assembly integrally formed with a hand weight constructed in accordance with various features of the present invention.

A weighted pet leash assembly constructed in accordance with various features of the present invention is illustrated at 10 in FIG. 1. This assembly includes a housing 12 which contains a leash 14 that is used for controlling a dog or other pet while walking. This leash 14 is carried in the housing 12 in a retracted state or condition and is normally stored on a spring biased reel 22. The reel assembly for dispensing and retracting the leash is of conventional design, and biases the reel for rotation to retract the leash if no opposing force is applied in the direction of the arrow 18.

The leash 14 exits the assembly 10 proximate an opening in the housing shown generally at the location 16. In operation, the leash 14 travels outwardly in the direction of the arrow 18 to allow the dog to move away from the assembly 10. An actuator such as a trigger 20 serves to selectively activate a stop mechanism for terminating travel of the leash through the opening 16. In the embodiment shown in FIG. 1, the leash is coiled on a reel 22 rotatably mounted in the housing. In a conventional manner depression of the trigger 20 serves to activate a stop 24 that is pivoted against the reel edge 22 thereby preventing further movement of the leash 14. The stop mechanism and trigger are of conventional design.

A hand weight such as a dumbbell indicated generally at 30a is combined with the leash assembly 10. This dumbbell 30a has a handle section 32 and opposite weighted end portions 34a and 34b. The handle section 32 is integral to the handle of the housing 10 such that gripping of the handle as shown in FIG. 2 places the finger of the user proximate the trigger 20 for selectively controlling the travel of the leash 14 through the opening 16.

Typically, power walking involves utilization of a pair of hand weights as indicated in FIG. 2. Use of the present invention allows a user to grip a conventional dumbbell 30b in the hand opposite the hand carrying the weighted pet leash assembly 10. Integral formation of the handle 32 of the dumbbell with the handle of the weighted assembly 10 as shown in FIG. 1 eliminates the awkwardness of a power walker simultaneously attempting to handle a weight and a leash assembly in the same hand.

It will be recognized by those skilled in the art, that the dumbbell 30 and its handle 32 can be coated with a suitable coating material such as neoprene that will reduce slippage and/or absorb perspiration.

In the preferred embodiment, integral formation of the handle 32 of the dumbbell 30 with the housing 12 of the assembly 10 defines a hand grip opening 40 into which the pivotal trigger 20 extends. In the embodiment depicted in FIG. 1 the trigger 20 is positioned proximate the upper portion of the opening 40. To this end, the index finger of the user has ready access to the trigger such that its depression will cause the stop 24 to press against the reel 22 to terminate the travel of the leash 14 through the opening 16.

It is anticipated that the leash assembly 10 would be used in combination with a second hand weight such as the dumbbell 30b to form a set. Certain consumers may desire that the weight of the assembly 10 combined with the dumbbell 30a shown in FIG. 1, be equivalent or substantially equivalent to the dumbbell 30b. In this connection, the weight of the dumbbell 30a can be slightly less than the weight of the dumbbell 30b such that the weight of the dumbbell 30a plus the leash housing 10 and its contents substantially approximate the weight of the dumbbell 30b. The weight equalization when the assembly is sold as a set with a dumbbell for the opposite hand may be particularly important if the leash is substantial or lengthy thereby causing an increase in the weight of the housing 12 and it contents including the stop mechanism.

An alternate configuration of the hand weight is shown by the phantom line 31 in FIG. 1. In this embodiment, the hand weight 31 is combined with the leash housing 12 to form an assembly having a smoother outline than a dumbbell. Of course, the configuration of the hand weight can vary as desired provided the handle is shaped to be readily gripped by a user. Moreover, the actuator 20 could be moved to a location 33 such that the thumb could serve to control the movement of the leash. Thus, any digit of the user can be used to engage the actuator, and the placement of the actuator can be varied as desired. If desired, the assembly including the hand weight 31 could be sold in a set with a second hand weight similarly shaped.

From the foregoing description, it will be recognized that the hand weight handle and the retractable leash handle have been combined to form a unitary weighted leash handle. This handle is hollowed out or otherwise fashioned with a cavity to accommodate a pivotally mounted actuator or trigger therein. The assembly 10 and matching hand weight normally weighs 2–5 pounds each. However, the weight may vary according to the strength of the power walker.

It should be understood that the foregoing description is only illustrative of a preferred embodiment of the invention. Various alternatives and modifications can be devised by those skilled in the art without departing from the spirit of the invention. Accordingly, the present invention is intended to embrace all such alternatives, modifications and variances which fall within the scope of the appended claims and the equivalents thereof.

We claim:

1. A weighted pet leash assembly comprising:
   a leash;
   a housing for containing said leash in a retracted condition and having a handle and an opening through which said leash travels;
   a stop mechanism for terminating travel of said leash through said opening;
   an actuator for selectively activating said stop mechanism; and
   a hand weight having weighted ends in opposing relationship and having a handle integral to the handle of said housing whereby gripping of said hand weight handle places a digit of a user proximate said actuator.

2. The weighted pet leash assembly of claim 1 wherein said hand weight integral to said housing defines a hand grip opening wherein said actuator is mounted proximate said integral hand weight and housing handle near the upper portion of said hand grip opening when said assembly is positioned in the vertical plane.

3. The weighted pet leash assembly of claim 1 and including a reel rotatably mounted within said housing, said reel having said leash coiled thereon.

4. The weighted pet leash assembly of claim 1 wherein said pet leash assembly is combined as a set with a second hand weight such that a power walker carries the weighted pet leash assembly in one hand and the second hand weight in the other hand while exercising.

5. The weighted pet leash assembly of claim 4 wherein the weight of the second hand weight is adjusted such that its weight approximates the combined weight of the weighted pet leash assembly operatively associated therewith.

6. The weighted pet leash assembly of claim 1 wherein said hand weight integral to the handle of said housing is coated to assist in preventing slippage in a user's hand during exercise.

7. The weighted pet leash assembly of claim 6 wherein said coating includes neoprene.

8. A weighted pet leash assembly comprising:
   a leash;
   a housing for containing said leash in a retracted condition and having a handle and an opening through which said leash travels;
   a stop mechanism for terminating travel of said leash through said opening;
   a trigger for selectively activating said stop mechanism; and
   a dumbbell having a handle integral to the handle of said housing whereby gripping of said dumbbell handle places the finger of a user proximate said trigger.

9. The weighted pet leash assembly of claim 8 wherein said dumbbell integral to said housing define a hand grip opening wherein said trigger is mounted proximate said integral dumbbell and housing handle near the upper portion of said hand grip opening when said assembly is positioned in the vertical plane.

10. The weighted pet leash assembly of claim 8 including a reel rotatably mounted within said housing, said reel having said leash coiled thereon.

11. The weighted pet leash assembly of claim 8 wherein said pet leash assembly is combined as a set with a second dumbbell such that a power walker carries the weighted pet leash assembly in one hand and the second dumbbell in the other hand while exercising.

12. The weighted pet leash assembly of claim 11 wherein the weight of the second dumbbell is adjusted such that its weight approximates the combined weight of the weighted pet leash assembly operatively associated therewith.

13. The weighted pet leash assembly of claim 8 wherein said dumbbell integral to the handle of said housing is coated to assist in preventing slippage in a user's hand during exercise.

14. The weighted pet leash assembly of claim 13 wherein said coating includes neoprene.

15. A weighted pet leash assembly set comprising:
    a leash;
    a housing for containing said leash in a retracted condition and having a handle and an opening through which said leash travels;
    a stop mechanism for terminating travel of said leash through said opening;
    a trigger for selectively activating said stop mechanism;
    a dumbbell having a handle integral to the handle of said housing whereby gripping of said dumbbell handle places the finger of a user proximate said trigger; and
    a second dumbbell operatively associated with said weighted pet leash assembly such that a power walker carries the weighted pet leash assembly in one hand and the second dumbbell in the other hand while exercising.

16. The weighted pet leash assembly of claim 15 wherein said dumbbell integral to said housing defines a hand grip opening wherein said trigger is mounted proximate said integral dumbbell and housing handle near the upper portion of said hand grip opening when said assembly is positioned in the vertical plane.

17. The weighted pet leash assembly of claim 15 including a reel rotatably mounted within said housing, said reel having said leash coiled thereon.

18. The weighted pet leash assembly of claim 17 wherein the weight of the second dumbbell is selected such that its weight approximates the combined weight of the weighted pet leash assembly operatively associated therewith.

19. The weighted pet leash assembly of claim 15 wherein said dumbbell integral to the handle of said housing is coated to assist in preventing slippage in a user's hand during exercise.

20. The weighted pet leash assembly of claim 19 wherein said coating comprises neoprene.

21. A weighted pet leash assembly comprising:
    a leash;
    a housing containing said leash;
    a hand weight having first and second opposite weighted ends and an intermediate body portion; and
    at least a portion of said hand weight being integrated with said housing to define a grip for holding the pet leash assembly in a user's hand.

* * * * *